Figure 1:
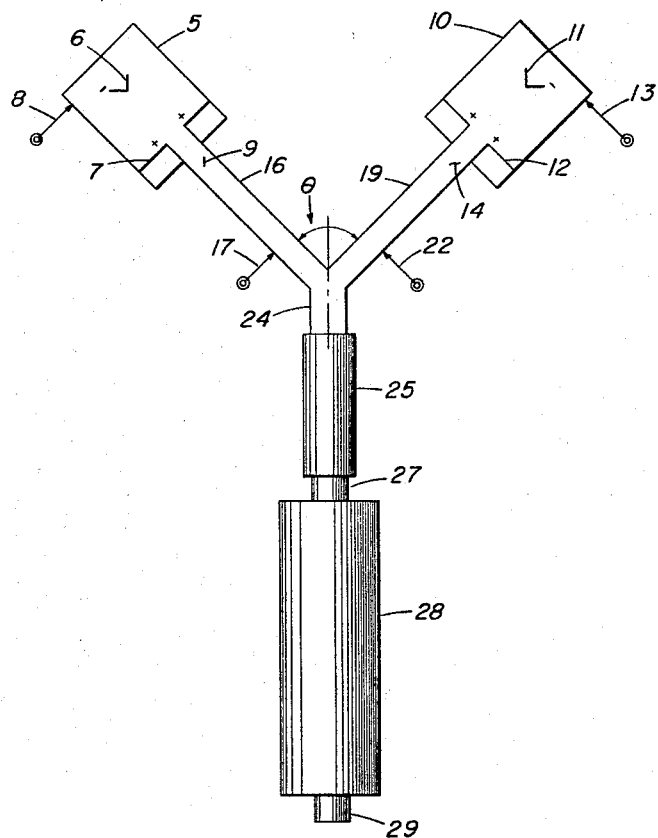

INVENTOR.
JOSEPH FRANCIS SKRIVAN

INVENTOR.
JOSEPH FRANCIS SKRIVAN
BY
William Kaufman
ATTORNEY 3,275,412
PRODUCTION OF OXIDES BY PLASMA PROCESS
Joseph Francis Skrivan, Stamford, Conn., assignor to American Cyanamid Company, Stamford, Conn., a corporation of Maine
Filed Feb. 4, 1965, Ser. No. 430,262
8 Claims. (Cl. 23—202)

This application is a continuation-in-part of application Serial No. 271,238, filed April 8, 1963.

This invention relates to an improved process for making particulate oxides of refractory metals and metalloids. More particularly, it relates to an improved method for conducting high temperature oxidation processes in the plasma jet.

Various methods of producing refractory metal and metalloid oxides are known at the present time. One method used to produce $TiO_2$, but applicable to other oxides as well, involves the digestion of titaniferous ore material with sulfuric acid to produce titanium sulphate. The sulphate is hydrolyzed to precipitate hydrous $TiO_2$. This may be calcined, if it is desired to produce a pigment grade titanium dioxide. The product obtained from this method is $TiO_2$ of a wide range of particle sizes. It is often necessary to subject the product to further treatment if it is desired to improve its quality for pigment application.

Another known method of producing oxides such as silicon dioxide or titanium dioxide is to react the respective tetrachloride with oxygen at an elevated temperature. In this method, the reactants are brought to reaction temperatures by burning an intimately mixed gas such as carbon monoxide or methane. The by-products of burning—carbon dioxide and/or water—are thus present during the tetrachloride-oxygen reaction, but, fortunately, they do not interfere with it. They do, however, have an impact on overall reaction efficiency. When carbon monoxide is burned as the heat source, it is converted to carbon dioxide. This gas contaminates the reactor effluent which has value for its chlorine content. Prior to recycling the chlorine to produce more $TiCl_4$ for burning, the carbon dioxide must be removed. This necessitates either a fractionation step with its cumbersome and expensive apparatus or some other separatory means. In any case, the burning of CO increases the $O_2$ demand for the process, resulting in increased costs which are by no means insignificant. When water is produced as a by-product of the burning gas—this being the case when methane is burned—a different sort of problem arises. One of the products of the reaction between tetrachloride and oxygen, is chlorine. If water is not present, there is no reason why the chlorine cannot be collected and utilized. It is noteworthy that dry chlorine gas does not introduce corrosion problems of the same order of magnitude as in a system containing water. If water is present, chlorine reacts with water to produce hydrogen chloride, thus leading to the double disadvantage of loss of valuable chlorine and introduction of a corrosion problem.

Normally, oxide powders obtained from known oxidation processes as described above, tend to have a preponderance of large particles. For pigmentary, filling, weighting and reinforcing applications, it is desirable to have a higher state of sub-division. This end has been accomplished by the addition to the reaction mixture of a significant amount of a material such as aluminum chloride which performs a nucleating function. While the contamination intentionally introduced for purposes of increasing nucleation is not normally too undesirable and can be tolerated, it will be recognized that the nucleating agent involves an added production cost which is, of course, of critical concern in large-scale operations.

In the copending application referred to above, a method is disclosed which, in large part, overcomes many of the disadvantages associated with known methods of producing finely divided oxides. It was found in accordance with that invention that oxide powders, particularly titanium dioxide, could be produced without utilization of an auxiliary burning gas and with reduced amounts of nucleating agents by conducting the oxidation of a metal or metalloid salt with a plasma jet generator. By this method, a gas is passed through a high energy electric arc and the resulting plasma (the term "plasma" being employed to designate a very hot, partially ionized gas stream) is contacted with the material to be oxidized and oxygen. The plasma is thus the source of heat for raising the reactants to a temperature at which oxidation is initiated. No by-products of burning are introduced into the gas stream and, thus, problems above associated with the prior art methods are obviated. Moreover, in view of the much higher temperatures which are attainable by this method, nucleation is much more general even without an added nucleating agent, perhaps due to the presence of electrically charged species in the plasma.

The general procedure employed in utilizing the plasma jet involves heating a gas such as nitrogen, argon, air, oxygen, etc., by means of an arc discharge to form a plasma stream. The reactants are brought either serially or simultaneously into intimate contact with the plasma stream in a manner such that the desired exothermic oxidation reaction is initiated. The resultant oxide product is secured by quenching the reactor effluent and collecting by conventional means the precipitated oxide powder.

A feature of this method is that it is useful for the production of any kind of refractory metal or metalloid oxide or mixtures of such oxides. The oxidizable starting material can be any inorganic metal or metalloid salt such as a halide (for example, a chloride or fluoride) or an oxyhalide (for example, the oxychloride). The metal or metalloid salts which can be converted are exemplified by silicon, titanium, aluminum, zirconium, iron and antimony compounds. It is feasible to use mixtures of such salts. Most important of the oxidizable compounds which can be converted by the plasma jet oxidation process are zirconium tetrahalide, silicon tetrahalide and titanium tetrahalide. These materials give oxide powders used in pigment, catalyst, rubber and paper applications. Aluminum oxides suitable for gem manufacture may also be produced by oxidation of the corresponding aluminum salt.

While the plasma jet method of producing refractory metal and metalloid oxides unquestionably avoids many obstacles and pitfalls associated with previously known synthetic methods, it is not, unfortunately, without its shortcomings. Probably the most significant of these is the speed with which a desired chemical reaction occurs. While this may seem paradoxical since short reaction times are normally very desirable, in this case reaction occurs so quickly that a significant amount of the product is produced in the area immediately surrounding the point at which the second reactant meets the first. This can be better explained by way of illustration. If the plasma stream is contacted with vaporous salt, the salt is elevated to reaction temperature. If the heated stream continues to the point where the oxidizing gas is introduced, it is in condition for immediate reaction. As soon as the two reactants meet, the product oxide is formed and tends to deposit on the relatively cool surfaces surrounding the oxygen inlet; thus deposition of the oxide proceeds, until finally, shutdown is required for purposes of unplugging the reactor. This, of course, would be an extremely undesirable drawback in a commercial operation. Attempts to reduce plugging by use of relatively more plasma results in poor size distribution of the particulate product.

In other words, it is extremely desirable from one standpoint and extremely undesirable from another standpoint to have the reaction proceed extremely quickly.

It is an object of the present invention to provide an improved method of preparing metal and metalloid oxide products with the plasma jet. More specifically, it is an object of the present invention to produce metal and metalloid oxides with the plasma jet in such a manner that the rate of reaction is extremely high, whereas the plugging of the reactor is substantially avoided. Other objects will be apparent from the following description of this invention.

In accordance with the present invention, at least one of the reactants is separately admixed with a plasma stream. For example, a metal or metalloid salt can be admixed with one stream of heat-supplying plasma, and, if desired, the oxygen-containing gas can be separately admixed with another stream of heat-supplying plasma. The two streams, at least one of which has been heated by a plasma stream, are brought together after the salt and/or oxygen have sufficient combined enthalpy to bring the mixture of reactants to reaction temperature. If only one reactant is heated with a plasma stream, it must have sufficient excess heat to raise the ultimate reaction mixture to reaction temperature. If all reactants are heated to above reaction temperature, then compensation is not necessary and none of the reactants must be heated much above the temperature at which reaction is initiated.

For the purposes of this invention, it is required that reactant streams meet or converge at an angle with respect to each other (shown in FIGURE 1 as $\theta$), of between about 25° and 160°, to form the reaction mixture, which is caused to flow along the path offering the least frictional resistance and producing the minimal change of momentum. It is noteworthy that a convering angle of about 90° gives efficient and trouble-free operation for a long period. Use of equipment in which the angle is varied slightly from the preferred angle does not result in a significant change in efficiency of the reaction. When the angle at which the two reactant streams impinge goes much below 90°, i.e., in the range of 25°–50°, it is found that the reactant streams will not intermix properly before entering the reaction zone unless the streams are flowing together with sufficient momentum to assure turbulence. Thus, as a general rule, the smaller the angle of convergence, the higher should be the flow rate of the reactants. At these small angles, however, the problem of plugging is minimized and the particle size distribution of the solid oxide product is generally poorer. If the angle of impingement is about 160°, efficiency of reaction is increased by reason of a higher order of mixing; but this increase in rate of reaction is accompanied by plugging problems. In view of the foregoing considerations, the preferred balance between high reaction and low plugging rates is obtained at practical reactant stream flow rates, when the angle of impingement of the two reactant streams is between 70° and 120°. Such an arrangement gives good mixing of the reactants without undue deposition of oxide on the walls of the reaction vessel.

The inert fluid used to form the plasma may be any gaseous material such as nitrogen, xenon, argon or helium. It is preferable that air is not used as the plasma heating the metal or metalloid salt. However, it is perfectly satisfactory if air or oxygen is used to form the plasma used in heating the oxidizing gas; and, indeed, if it itself is used to supply reactant oxygen.

Generally, the plasma should be heated to a temperature of about 3,000° C. to 12,000° C. prior to being admixed with the reactant. The quantity of reactant salt or salts which is admixed with a given amount of plasma depends, of course, on the desired reaction temperature and heat losses expected to occur before the reactants are admixed. In most operations, the quantity of plasma will be about 3–95% of the total gas mixture and preferably about 5–45% of the volume of the gas. The total volume of gases should be such that reactant streams flow together with turbulent mixing.

It is understood that the inert gas used to form the plasma may be preheated by any practical means before being fed into the plasma generator and, likewise, the individual reactants may be preheated by such means as recycle of reaction zone effluents. Normally, such conventional heat exchange methods can raise either the reactants or the inert gas to temperatures of about up to 600° C.

The temperature at which the oxidation reaction is initiated will, of course, depend upon the particular salt which is being oxidized. Initiation temperatures are well-known for such salts as the halides of aluminum, silicon, titanium, antimony and baron. The actual temperature to which the reactants are raised may be well above the initiation temperatures in order to hasten the rate of reaction and to reflect particle size requirements. In general, the reaction mixture should remain in the zone of reaction for a period of at least 0.001 second and, practically speaking, the residence need not be longer than one second. More usually, a residence of about 0.02 to .1 second is adequate and will give the product in the desired particle size.

In the case of titanium dioxide where it may be desired to enhance the yield of the rutile crystalline form as against the anatase form, a small amount of aluminum chloride may be fed into the reaction zone, as for example by admixture with the titanium tetrachloride reactant stream. The amount of aluminum chloride used for this purpose may vary over a wide range. In general, about 0.16 to 6.3% or, more preferably, 1.6 to 4.7% by weight of the product oxide should be employed. Advantageously, titanium dioxide pigment produced by this method (with or without aluminum chloride) is found to have a large proportion of particles in the optimum size range of 0.17 to 0.22 micron.

The amount of oxygen used will, in the first instance, depend upon the stoichiometry of the reaction. For practical results, at least a stoichiometric amount should be used based upon the salt to be oxidized. It is normally desirable to have an excess of oxygen available for reaction. This excess can, without practical inconvenience, be as high as 100% by volume, or even higher. More usually, a 15–50% by volume excess of oxygen is employed with good results.

To provide a fuller understanding of the present invention, reference will now be made to the accompanying drawing and the following description of FIGURE 1. It is intended to thereby illustrate, on a laboratory scale, how the present invention is employed to oxidize TiCl$_4$ to give TiO$_2$.

IN FIGURE 1, a plasma jet generator 5, of conventional design, has a negative electrode 6 and an annular positive electrode 7. An arc is struck between the two electrodes. Nitrogen is fed to the generator 5 by means of a line 8, and it passes by electrode 6 and flows through electrode 7 to an exit point 9. The nitrogen stream stabilizes the arc and, in turn, the arc heats the nitrogen to the desired temperature. A second plasma jet generator 10 also contains a negative electrode 11 and an annular positive electrode 12, and an arc is struck between them. Nitrogen, fed to the generator 10 by means of line 13, passes within the generator between the positive and negative electrodes 11 and 12, stabilizing the electric arc and, in turn, being heated by it. The nitrogen leaves the generator 10 at exit point 14.

The nitrogen is discharged from generator 5 into a ½″ D. x 2″ pipe 16. About one inch from the discharge point 9 of generator 5, oxygen is fed to pipe 16 by means of line 17. Another generator 10 likewise discharges preheated nitrogen into another ½″ D. x 2″ pipe 19. At a distance of about one inch from the discharge point 14, TiCl$_4$ is fed into pipe 19 by means of line 22. Pipes 16 and 19 form an angle which, as shown in the drawing, is 90°.

The reactant-containing nitrogen streams flowing into pipes 16 and 19 converge at an angle θ at the entrance of conduit 24 which serves as a mixing zone. Pipe 24, which is 9/16" long and 11/16" in diameter, forms an angle of 135° with respect to both pipe 16 and pipe 24, and is connected with a reactor 25. Reactor 25 is connected through conduit 27 to a water-cooled heat exchanger 28. The heat exchanger 28 is a pipe 6" in diameter and 6' long fitted with an exit pipe 29.

The heated mixture of oxygen and TiCl₄ reacts in reactor 25 to yield TiO₂ in particulate form and chlorine. The reactor effluent is conducted through conduit 27 to the heat exchanger where the product is cooled and released through pipe 29 to be further subjected to various conventional collecting, separating and conditioning procedures necessary and desirable to entrap the metal oxide, obtain by-product chlorine and recycle unreacted starting materials.

EXAMPLE 1

A series of runs was conducted in equipment such as is shown in FIGURE 1 of the drawing, wherein θ is 90°, for the purpose of illustrating the effect on product characteristics of variations in plasma flow rate, reactant concentration, reactor temperature and residence time. The details of these runs are presented in Table I. In the table, the individual plasma generators are referred to as "Gen. #5" and "Gen. #10" to conform with the drawing. Runs 10–16 were conducted with added AlCl₃ to show the effect of this agent upon particle size and crystalline form of the oxide product. The "percent Rutile" values are obtained by dividing the weight of rutile in the product by the total weight of TiO₂ existing in both the rutile and anatase crystalline forms.

troducing the reactants directly into the same plasma stream, the accumulation of solids at the point where the reactants meet in the reaction vessel is sufficient to force a shut-down within five minutes.

EXAMPLE 3

In a manner similar to the previous example, 20 g./minute of vaporous ZrCl₄ (at a temperature in excess of 350° C. to prevent its desublimation) and 6 g./minute of O₂ are fed to the separate arms of the Y-vessel (90° angle). Heat is supplied by N₂ plasma. After 15 minutes of operation, essentially no solid product is found in the Y-vessel, and a good grade of ZrO₂ of particle size in the range of 0.2–0.3 micron, is obtained.

EXAMPLE 4

A Y-shaped vessel in which the angle is 60°, is used for the reaction of TiCl₄ and O₂ under conditions which are otherwise identical to Run 11 of Example 1.

No significant difference in solids build-up is observed. However, the proportion of coarse particles to fine particles, increases. In terms of pigment application, this change is reflected in a loss of tinting strength.

EXAMPLE 5

In a Y-shaped vessel, under conditions similar to those described in Example 1, 31.1 grams per minute of TiCl₄ were fed to the preheater. After operation for 1,028 seconds, the unit was shut down and inspected. Essentially no pigment deposit was found at the point of mixing of the two reactant-containing streams. The pigment produced in this configuration had a tinting strength of over 1600, measured of the crude pigment.

EXAMPLE 6

This example is intended to show the effect upon the permissible operating time of contacting the reactants in

*Table I*

PREPARATION OF TiO₂

| Run No. | Flow Rate (millimoles/second) | | | | Temperature (° C.) | | | | Reactor Temp. (° C.) | Residence in Reactor (millisec.) | Average Particle Size (micron) | Percent AlCl₃ | Percent Rutile |
|---|---|---|---|---|---|---|---|---|---|---|---|---|---|
| | N₂ Gen. #5 | N₂ Gen. #10 | O₂ | TiCl₄ | N₂ Gen. #5 | N₂ Gen. #10 | N₂-O₂ Mix. | N₂-TiCl₄ Mix. | | | | | |
| 1 | 6.25 | 6.25 | 3.4 | 1.8 | 2,700 | 2,700 | 1,150 | 930 | 1,325 | 36.4 | .20 | 0 | 24 |
| 2 | 4.9 | 4.9 | 3.4 | 1.3 | 4,200 | 3,300 | 2,780 | 1,930 | 1,950 | 32.1 | .17 | 0 | 39 |
| 3 | 4.9 | 4.9 | 3.4 | 1.5 | 4,400 | 3,200 | 2,760 | 1,580 | 1,850 | 63.4 | .15 | 0 | 21 |
| 4 | 4.9 | 4.9 | 3.4 | 1.3 | 4,300 | 3,000 | 2,930 | 1,760 | 1,930 | 2.8 | .13 | 0 | 12 |
| 5 | 4.9 | 4.9 | 3.4 | 1.3 | 4,500 | 3,000 | 2,980 | 1,730 | 1,940 | 17.6 | .15 | 0 | 21 |
| 6 | 4.9 | 4.9 | 3.4 | 1.3 | 4,400 | 3,000 | 2,780 | 1,530 | 1,840 | 48.4 | .16 | 0 | 17 |
| 7 | 5.95 | 5.95 | 5.3 | 2.3 | 3,800 | 3,300 | 2,240 | 1,680 | 1,790 | 25.5 | .16 | 0 | |
| 8 | 2.9 | 2.9 | 4.0 | 3.1 | 4,900 | 4,800 | 2,650 | 1,460 | 1,740 | 148.0 | .21 | 0 | 68 |
| 9 | 2.9 | 2.9 | 4.0 | 2.3 | 5,000 | 4,800 | 2,900 | 1,680 | 1,825 | 40.6 | .18 | 0 | 43 |
| 10 | 2.9 | 2.9 | 4.0 | 2.3 | 5,300 | 5,000 | 3,260 | 2,130 | 1,990 | 37.3 | .17 | 2.5 | 89 |
| 11 | 2.9 | 2.9 | 4.0 | 2.3 | 5,200 | 4,900 | 2,660 | 1,580 | 1,830 | 40.2 | .18 | 2.8 | 92 |
| 12 | 2.9 | 2.9 | 4.0 | 2.8 | 5,200 | 4,800 | 3,240 | 1,680 | 1,860 | 73.2 | .20 | 1.3 | 71 |
| 13 | 2.9 | 2.9 | 4.0 | 2.7 | 5,000 | 4,700 | 2,450 | 1,330 | 1,750 | 77.8 | .23 | 1.3 | 75 |
| 14 | 2.9 | 2.9 | 4.0 | 2.5 | 4,900 | 4,800 | 3,500 | 2,400 | 2,070 | 68.2 | .21 | 1.3 | 72 |
| 15 | 2.9 | 2.9 | 4.0 | 1.8 | 5,200 | 4,700 | 2,850 | 1,680 | 1,890 | 40.8 | .18 | 1.1 | 72 |
| 16 | 2.9 | 2.9 | 4.0 | 2.3 | 5,000 | 4,600 | 2,100 | 1,180 | 1,700 | 43.3 | .18 | 3.1 | 98 |

EXAMPLE 2

Into the separate arms of a Y-shaped vessel through which are flowing separate streams of nitrogen plasma at the rate of 2½ liters/minute in each arm, are fed vaporous silicon tetrachloride and oxygen. The flow rate of the salt is five grams per minute, and of the oxygen 2 liters/minute (N.T.P.). The respective streams converge and flow through the leg of the vessel where reaction takes place at a temperature in excess of 1200° C. Silicon dioxide is continuously formed and collected. Even after twenty minutes of operation, the deposition of solids in the Y-shaped vessel is negligible. The silicon dioxide product has an average particle diameter in the range of 100 angstroms.

If the same reaction is conducted with the same proportions of reagents and plasma in a tube reactor by introducing plasma streams flowing toward each other in opposite directions (i.e., using a mixing chamber of the form shown in FIGURE 1, wherein θ=180°). To expedite the understanding of this experiment, the description thereof will be made in conjunction with FIGURES 2, 3, 4 and 5.

Figure 2:
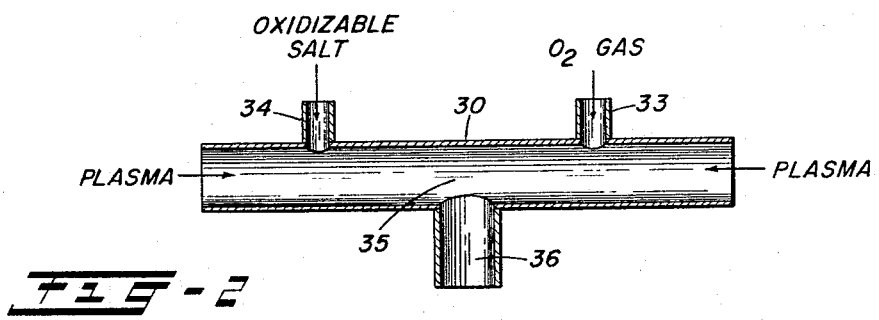

Referring first to FIGURE 2, a T-shaped vessel 30 is provided with plasma-producing means at ends 31 and 32. Nitrogen plasma is caused to flow into 30 from points 31 and 32 by point 35 into tube 36. Vaporous titanium tetrachloride is fed into 30 via pipe 34 at the rate of 28 grams per minute. Oxygen is fed via entry point 33 at a rate substantially in excess of that required for completely burning all the titanium tetrachloride. The separate reactant-containing streams meet head-on at point 35 and merge into tube 36. Sufficient electrical power is supplied to the nitrogen plasma to insure a temperature in excess of 1600° C. at point 35. After only 62 seconds of operation, the reaction had to be discontinued due to growth of a very hard granular deposit of titanium dioxide in the area of point 35. This deposit had the effect of blocking the flow of gases into tube 36 and was attended by a large pressure increase in the system. The particle size distribution curve, found by plotting size versus concentration, was found to be relatively flat. The tinting strength of the product was found to be correspondingly low.

Figure 3:
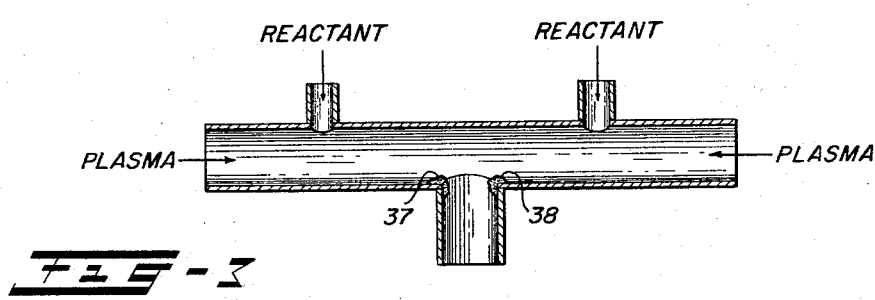
Figure 4:
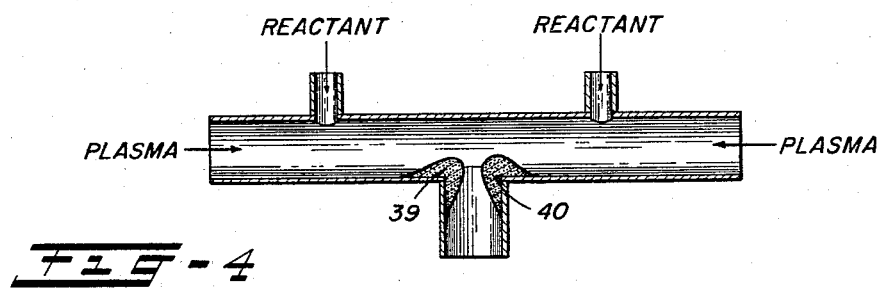
Figure 5:
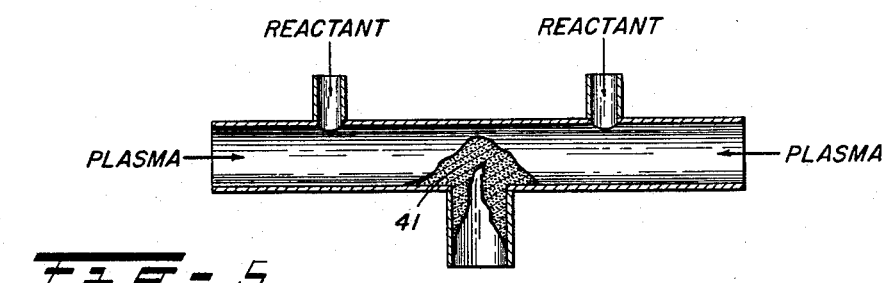

In FIGURES 3–5 is shown the stepwise build-up of hard deposit as it was found to occur. In FIGURE 3, soon after operation is initiated, it is seen that small deposits start forming at points 37 and 38. Soon thereafter, continuing operation results in large accumulations, as shown in FIGURE 4 at points 39 and 40. Not long after operation is initiated, the deposits coalesce to form a plug 41 as shown in FIGURES 4 and 5.

The foregoing examples are intended to illustrate various modes of practicing the present invention. It will be obvious that slight modifications in materials, procedure and equipment may be made without departing from the scope of this invention. Two or more oxidizable materials may be oxidized simultaneously with the production of mixed oxide particles. Either oxygen or the oxidizable material may be fed into the mixing zone at more than one point of entry so long as the reacting streams in all cases converge at an angle within the range disclosed above.

I claim:

1. In the process of continuously preparing finely divided refractory oxides by contacting an oxygen-containing stream with at least one stream of at least one member selected from the group consisting of vaporous metal and metalloid salts, the improvement which comprises admixing at least one of said reactant streams with a stream of gaseous fluid heated by means of a plasma generator to a temperature in the range of 3,000°–12,000° C., contacting said reactant streams flowing at an angle with respect to each other of between about 50° and 160°, passing the resulting mixture of reactants to a reaction zone for a period of about .001 to 1 second, and then collecting the resultant oxide product.

2. The process of claim 1 wherein one oxygen-containing stream is contacted with one salt-containing stream.

3. The process of claim 1 wherein each reactant is contacted with a hot plasma stream.

4. The process of claim 1 wherein the vaporous salt is titanium tetrachloride.

5. The process of claim 1 wherein the plasma is a nitrogen gas.

6. A process of preparing titanium dioxide which comprises heating separately two streams of inert fluid by means of plasma generators of temperatures in the range of about 3,000° C. to 12,000° C., mixing $TiCl_4$ with one of the resultant plasma streams, the temperature of the resultant mixture being about 600° C. to 3,000° C.; mixing at least a stoichiometric amount of oxygen with the other plasma stream, the temperature of the second mixture being about 600° C. to 4,000° C., admixing the two streams containing $TiCl_4$ and oxygen containing gas at an angle of about 90° with respect to each other; passing the same through a reaction zone, the quantity of inert fluid in the total mixture being about 3 to 95% by volume and the temperature of the reaction mixture in the reaction zone being about 800° C to 3,000° C., the residence time of the reaction mixture in the reaction zone being about .001 to 1 second, and collecting the titanium dioxide thereby produced.

7. The process of claim 6 wherein aluminum chloride is introduced into one stream in an amount equal to about 0.16 to 6.3% by weight of product $TiO_2$.

8. In the process of continuously preparing finely divided refractory oxides by contacting an oxygen-containing stream with at least one stream of at least one member selected from the group consisting of vaporous metal and metalloid salts, the improvement which comprises admixing at least one of said reactant streams with a stream of gaseous fluid heated by means of a plasma generator to a temperature in the range of 3,000°–12,000° C., contacting said reactants streams flowing at an angle with respect to each other of between about 70° and 120°, passing the resulting mixture of reactants to a reaction zone for a period of about .001 to 1 second, and then collecting the resultant oxide product.

References Cited by the Examiner

UNITED STATES PATENTS

| | | | |
|---|---|---|---|
| 2,979,449 | 4/1961 | Sheer et al. | 204—164 |
| 3,069,281 | 12/1962 | Wilson | 23—202 |
| 3,114,691 | 12/1963 | Case | 204—328 X |

OSCAR R. VERTIZ, *Primary Examiner.*

MAURICE A. BRINDISI, E. STERN *Examiners.*

UNITED STATES PATENT OFFICE
CERTIFICATE OF CORRECTION

Patent No. 3,275,412                          September 27, 1966

Joseph Francis Skrivan

It is hereby certified that error appears in the above numbered patent requiring correction and that the said Letters Patent should read as corrected below.

Column 3, line 50, for "about" read -- above --; column 4, line 16, for "baron" read -- boron --; column 6, line 33, for "of" read -- on --; columns 6 and 7, in Table I, first column, line 16 thereof, for "6" read -- 16 --; column 8, line 7, for "of" read -- to --.

Signed and sealed this 29th day of August 1967.

(SEAL)
Attest:

ERNEST W. SWIDER                          EDWARD J. BRENNER
Attesting Officer                           Commissioner of Patents